April 28, 1959 J. G. KNOWLES 2,884,095
HYDRAULIC BRAKE SYSTEMS
Filed Aug. 9, 1957 2 Sheets-Sheet 2
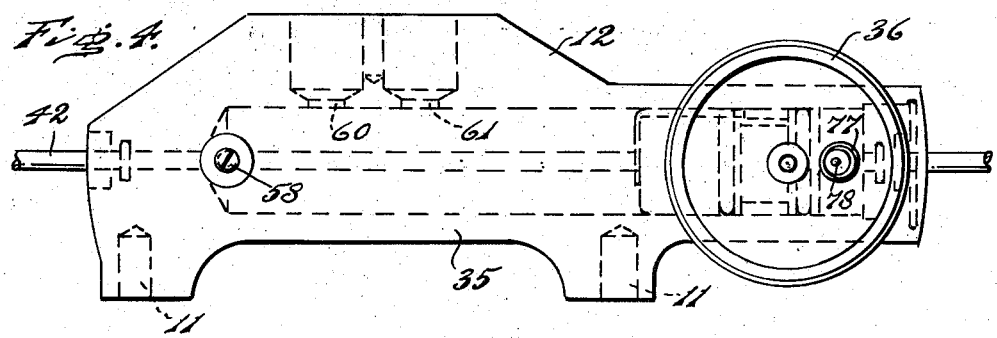
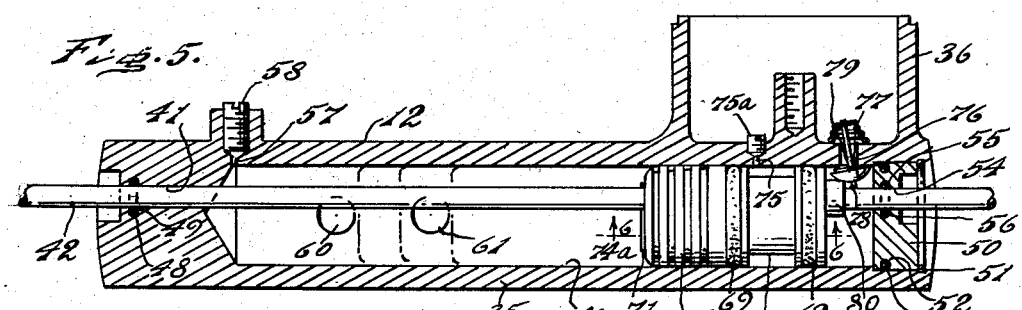
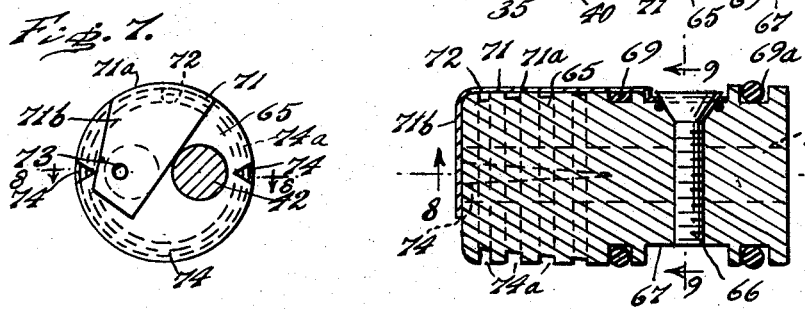
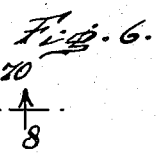
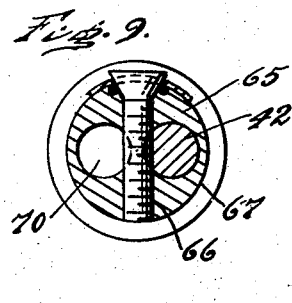
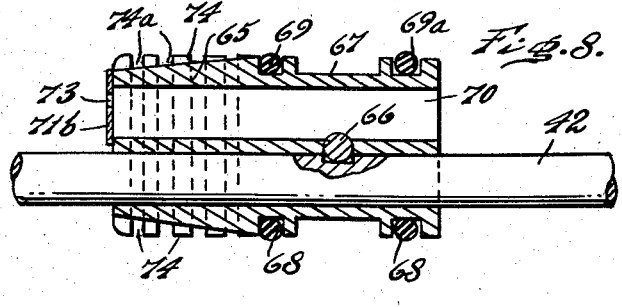
INVENTOR
John G. Knowles
BY
ATTORNEY United States Patent Office 2,884,095
Patented Apr. 28, 1959

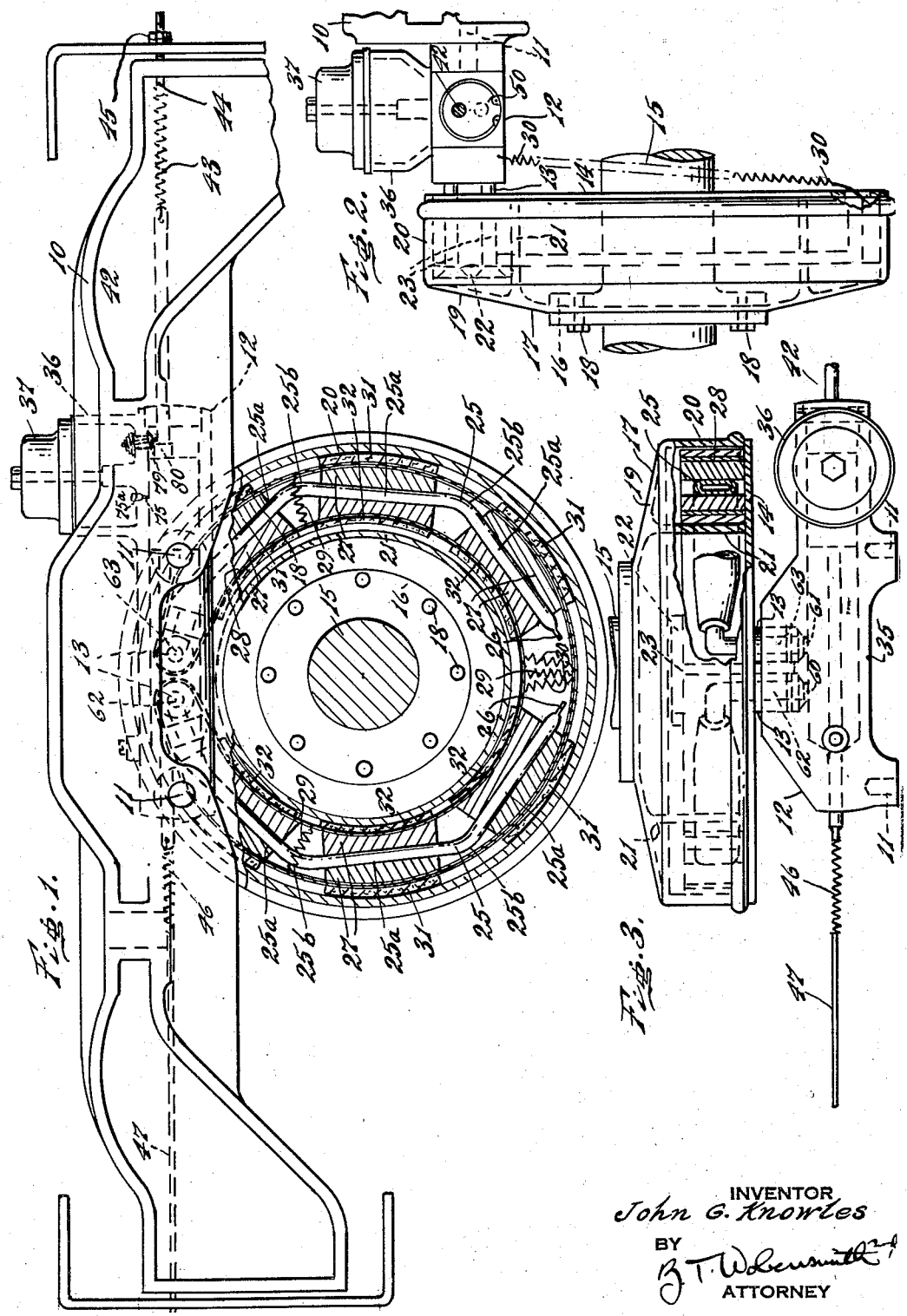

2,884,095

HYDRAULIC BRAKE SYSTEMS

John G. Knowles, Huntingdon Valley, Pa.

Application August 9, 1957, Serial No. 677,359

6 Claims. (Cl. 188—74)

This invention relates to hydraulic brake systems, and more particularly to a hydraulic brake system suitable for, but not limited to, use as an emergency brake on motor vehicles and the like.

In accordance with the present invention a brake system is provided which is relatively simple in construction and inexpensive to manufacture.

In accordance with the present invention, also, a brake system is provided for the controlled application of a braking force and in which partial or complete braking can be effected as desired.

In accordance with the present invention, also, a hydraulic brake system is provided in which the component parts are assembled in a manner so as to be readily accessible for inspection, maintenance and repair.

In accordance with the present invention, also, a hydraulic brake system is provided having improved structure for the application of a braking force.

In accordance with the present invention, also, a hydraulic brake system is provided embodying a control valve mechanism of improved character.

Other objects and advantageous features of the invention will be apparent from the description and claims.

The nature and characteristic features of the invention will be more readily understood from the following description, taken in connection with the accompanying drawings forming part thereof, in which:

Figure 1 is a front elevational view of a brake system in accordance with the invention, parts being broken away to show the details of construction;

Fig. 2 is an end elevational view of the hydraulic brake system shown in Fig. 1;

Fig. 3 is a top plan view of the brake system shown in Fig. 1, parts being broken away to show the details of construction;

Fig. 4 is a top plan view, enlarged, of a valve housing and associated structure employed in connection with the invention;

Fig. 5 is a vertical longitudinal sectional view of the valve housing and associated structure shown in Fig. 4;

Fig. 6 is an enlarged horizontal sectional view taken approximately on the line 6—6 of Fig. 5;

Fig. 7 is an end elevational view of the valve plug shown in Fig. 6;

Fig. 8 is a sectional view taken approximately on the line 8—8 of Fig. 7; and

Fig. 9 is a transverse sectional view taken approximately on the line 9—9 of Fig. 6.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a mounting and supporting frame is shown at 10 which can be a part of the cross frame of a vehicle, or any other desired frame construction.

The frame 10 has secured thereto in any desired manner, such as by a plurality of studs 11, a valve housing 12. The valve housing 12 has secured thereto, preferably by connectors 13, a stationary brake housing 14, hereinafter more fully described.

The shaft 15 to which the braking force is to be applied preferably has a flange 16 secured thereto to which a brake drum housing 17 is connected in any desired manner such as by a plurality of studs 18.

The brake drum housing 17 has a frusto-conical end wall 19 from which an outer rim 20 and an inner rim 21 extend. One of these rims, such as the outer rim 20, is eccentric to the shaft 15 and the other of these rims, such as the inner rim 21, is concentric to the shaft 15 and thus eccentric to the other rim.

The connectors 13 are secured at their outer ends to a plate 22 and bolts 23, extending from the plate 22 and into threaded engagement in the valve housing 12 support the outer ends of the connectors 13.

Each of the connectors 13 has connected thereto and extending therefrom a flexible tube 25, preferably of flattened elliptical cross section as illustrated in Fig. 3, and closed at its lower end by an end closure 26.

While the tubes 25, between their ends, can be of any desired shape, it is preferred that they have a plurality of substantially straight portions 25a connected by curved portions 25b.

Each of the tubes 25 has the straight portion 25a thereof enclosed on the inner and outer sides thereof by insulating blocks 27, of relatively rigid material such as brake lining material.

The connectors 13 have mounted thereon an endless band 28, in the form of a metal strap, which extends outwardly around and in encasing relation to the exteriors of the insulating blocks 27 and inwardly around and in encasing relation to the portions of the insulating blocks 27 remote from the tubes 25.

Springs 29 can be provided at a plurality of locations for normally urging the inner and outer portions of the band 28 towards each other, and additional diverging springs 30 can be provided connected to the outer run of the band 28 and to the valve housing 12, and extending through slots in the housing 14, for aiding in maintaining the band 28 out of braking position.

The band 28 is provided, at a plurality of locations on the exteriorly disposed face thereof, with strips 31 of lining material which may be of any desired type, such as that available for brake linings. The interiorly disposed face of the band 28 is also provided with a plurality of strips 32 of brake lining material. The brake lining strips 31 and 32 can be secured to the band 28 in any desired manner, such as by bonding, riveting, or the like.

The valve housing 12, shown in more detail in Figs. 4 and 5, preferably has an elongated body portion 35 with a liquid reservoir 36 at one end thereof. The reservoir 36 is closed in any desired manner, such as by a closure 37, to prevent the access of dirt, water and the like and to permit filling.

The valve housing 12 has a central longitudinally extending bore 40 providing a valve chamber, with a bore 41 at one end thereof having its axis offset with respect to the longitudinal axis of the bore 40 and for the reception of a valve operating rod 42. The valve operating rod 42 is connected by a coil spring 43 at one end to an adjustable mounting including a threaded stud 44 extending through a portion of the frame 10 and lock nuts 45 on the stud 44. The other end of the valve operating rod 42 is connected by a coil spring 46 to an actuating rod 47.

The bore 41 can be provided with a groove 48 therein for the reception of a sealing ring 49, such as an O-ring, which, by its engagement with the groove 48 and with the valve rod 42, prevents fluid leakage at this location.

The bore 40 is closed at its outer end by a closure plug 50, which is held in position in any desired manner, such as by a snap ring 51.

The closure plug 50, on the outer peripheral face thereof is preferably provided with a groove 52 for the reception of a packing ring 53, such as an O-ring, for preventing fluid leakage at this location and has an opening 54 therethrough aligned with the bore 41 for the passage of the valve rod 42. The closure plug 50 can be provided with a groove 55 for the reception of a packing ring 56, such as an O-ring, for preventing fluid leakage between the valve rod 42 and the closure plug 50.

The bore 40, at its inner end is provided with a bleed vent 57 for the bleeding of air from the system and the bleed vent 57 is normally closed by a plug 58.

The bore 40, in predetermined spaced relation inwardly from the end thereof is provided with spaced ports 60 and 61 which are in communication with passageways 62 and 63 in the interior of the connectors 13 and thus in communication with the interiors of the tubes 25.

A valve plug 65 is provided, shown in detail in Figs. 6 to 9, inclusive, which is secured to the valve rod 42 in any desired manner and at a predetermined location for cooperation with the ports 60 and 61. For this purpose, a threaded stud 66 can be provided extending through the valve plug 65 at a portion 67 thereof of reduced diameter and in engagement with the valve rod 42.

The valve plug 65 is provided, at spaced locations thereon and on opposite sides of the portion 67, with spaced peripheral grooves 68 for the reception of packing rings 69 and 69a, such as O-rings. The valve plug 65, in parallel relation to the opening therethrough through which the valve rod 42 extends is provided with a passageway 70. The valve plug 65 has mounted thereon a port shield and valve plate 71 of spring steel or like resilient material, having an arcuate portion 71a mounted in a recess 72 in the valve plug 65 and extending in covering relation to the sealing ring 69 and along the portion 67 and an end portion 71b extending along the end face of the valve plug 65 in covering relation to the end of the passageway 70. The end portion 71b is provided with a port 73 therethrough for permitting a limited flow of fluid into the passageway 70 upon movement of the valve plug 65 to the left, as shown in Figs. 5, 6, and 8, and is capable of swinging or flapping movement to permit of increased flow thereby upon movement of the valve plug 65 to the right, as shown in Figs. 5, 6 and 8. The valve plug 65 does not fit tightly in the bore 40 but has a diametrical clearance with respect thereto of the order of 0.006 inch. The valve plug 65 is provided with a plurality of V-shaped diverging grooves 74 extending substantially from just beyond the packing ring 69 and terminating at an end face of the valve plug 65 from which a plurality of peripheral grooves 74a extend to the recess 72 to provide leakage or bleed passageways.

The reservoir 36 is connected to the bore 40 by a passageway 75 for bleeding air from the portion 67 and this passageway 75 is provided with a closure plug 75a therein.

A port 76 is provided in the bore 40 connecting the reservoir 36 to the bore 40 and is provided with a valve which includes a plug 77 mounted on a valve stem 78 extending through the port 75. The valve stem 78 is supported by a resilient mounting 79, such as a conical spring, which normally urges the valve plug 77 to closed position with respect to the port 75 but permits of the valve plug 77 being moved to open position upon engagement of a collar 80 secured to the valve rod 42 with the valve stem 78.

The mode of operation will now be pointed out.

Assuming that the tubes 25, the passages in the connectors 13, and the bore 40 to the left of the valve plug 65 are filled with liquid and that a supply of liquid is also in the reservoir, in the released position the valve plug 65 will be at the right hand end of the bore, as seen in Fig. 5. The shaft 15 will rotate freely.

If it is desired to partially apply the brakes the valve rod 42 is moved to the left but not to the extent to cover the port 61. The movement of the valve plug 65 tends to increase the pressure of the liquid in the bore 40 and the extent of movement of the valve plug 65 will determine the pressure of the liquid applied through the ports 60 and 61 and through the passageways 62 and 63 to the exteriors of the tubes 25. As the pressure is applied in the tubes 25 they are expanded from their flattened elliptical position towards a more circular cross section and the force exerted thereby is effective for moving the band 28 to bring the lining strips 31 and 32 into engagement with the inner and outer brake rims 21 and 20. A dragging or braking effect of limited extent can thus be accomplished.

It will be noted that there is a tendency, because of the eccentricity of the rims 20 and 21 with respect to each other, to initiate a pumping action from one tube 25 to the other through the passageways 62 and 63, the ports 60 and 61 and the interior of the bore 40, but free from any obstruction in the bore 40.

Upon further movement of the valve plug 65 to the left the port 61 is partially or wholly covered, dependent upon the positioning of the valve plug 65, so that a controlled restrictive action is thus set up between the tubes 25 and a greater braking effect is available than before.

If now the valve plug 65 is moved still further to the left a limited bleed or leakage, but less than that available with the valve plug 65 in partial closing relation to the port 61, is permitted through the grooves 74 and 74a for a still further increased braking effect.

If now the valve plug 65 is moved further to the left so as to cut off communication between the ports 60 and 61 no fluid can be pumped from one tube 25 to the other so that a maximum braking effect or locking of the lining strips 30 and 31 with respect to the drums 20 and 21 is effected.

During movement of the valve plug 65 to the left the suction effect of the movement of the valve plug 65 to the left is effective for opening the valve plug 77 with respect to the port 75 to permit additional fluid to enter the bore 40 at the right hand end of the valve plug 65.

Upon return movement of the valve plug 65 from its extreme left hand position restricted communication between the tubes 25 will be established and then less restricted and finally free communication between the ports 60 and 61 will be established as a reverse of that previously described for the movement to the left of the valve plug 65.

Upon movement to the left of the valve plug 65, also, the valve plate end portion 71b will move from its covering relation with respect to the end of the passageway 70 to permit the more rapid return of the valve plug 65.

As the valve plug 65 moves to the right, also, the collar 80 will strike the valve stem 78 and move the valve plug 77 to a position to uncover the port 76 and permit the return of fluid to the reservoir 36. It will be noted that the port shield and valve plate 71 is positioned so as to protect the sealing ring 69 upon movement of the valve plug 65 over the port 61.

The port 73 in the valve plate end portion 71b permits a limited flow from one side to the other of the valve plug 65 and provides a cushioning action upon the movement of the valve plug 65 to the left so as to provide a smooth application of the braking effect.

I claim:

1. A hydraulic brake system for a shaft comprising a brake drum carried by said shaft and having spaced rim portions in varying spaced relation to each other, a fixedly mounted frame, fluid operated expansible members carried by said frame and disposed in the space between said rim portions, mounting members interposed between said frame and said expansible members, members interposed between said expansible members and said rim portions for braking engagement with said rim portions, said last members including a band member having end portions carried on said mounting members and spaced intermediate portions between said rim portions and said expansible members, a valve housing having spaced ports connected respectively to the interiors of said expansible members, a valve member in said valve housing, and an actuating member for said valve member, said valve member being movable with respect to said ports to permit free flow between said ports, restrict the flow between said ports and cut off the flow between said ports.

2. A hydraulic brake system as defined in claim 1 in which said expansible members are elliptical tubes and have closed ends.

3. A hydraulic brake system for a shaft comprising a brake drum carried by said shaft and having spaced rim portions in varying spaced relation to each other, a fixedly mounted frame, fluid operated expansible members carried by said frame and disposed in the space between said rim portions, mounting members interposed between said frame and said expansible members, members interposed between said expansible members and said rim portions for braking engagement with said rim portions, said last members including a band member having end portions carried on said mounting members and spaced intermediate portions between said rim portions and said expansible members, said band member having mounted thereon friction facing portions for braking engagement with said rim, a valve housing having spaced ports connected respectively to the interiors of said expansible members, a valve member in said valve housing, and an actuating member for said valve member, said valve member being movable with respect to said ports to permit free flow between said ports, restrict the flow between said ports and cut off the flow between said ports.

4. A hydraulic brake system for a shaft comprising a brake drum carried by said shaft and having spaced rim portions in varying spaced relation to each other, a fixedly mounted frame, fluid operated expansible members carried by said frame and disposed in the space between said rim portions, members interposed between said expansible members and said rim portions for braking engagement with said rim portions, a valve housing having spaced ports connected respectively to the interior of said expansible members, a valve member in said valve housing, and an actuating member for said valve member, said valve member including a valve plug having a passageway therethrough, said valve plug having a check valve carried thereby movable to open position upon movement of said valve plug in one direction, said valve member being movable with respect to said ports to permit free flow between said ports, restrict the flow between said ports and cut off the flow between said ports.

5. A hydraulic brake system for a shaft comprising a brake drum carried by said shaft and having spaced rim portions in varying spaced relation to each other, a fixedly mounted frame, fluid operated expansible members carried by said frame and disposed in the space between said rim portions, members interposed between said expansible members and said rim portions for braking engagement with said rim portions, a valve housing having spaced ports connected respectively to the interiors of said expansible members, a valve member in said valve housing, and an actuating member for said valve member, said valve member including a valve plug having a passageway therethrough, said valve plug having a check valve carried thereby movable to open position upon movement of said valve plug in one direction and having a bleed port for permitting restricted flow past said check valve in closed position, said valve member being movable with respect to said ports to permit free flow between said ports, restrict the flow between said ports and cut off the flow between said ports.

6. A hydraulic brake system for a shaft comprising a brake drum carried by said shaft and having spaced rim portions in varying spaced relation to each other, a fixedly mounted frame, fluid operated expansible members carried by said frame and disposed in the space between said rim portions, members interposed between said expansible members and said rim portions for braking engagement with said rim portions, a valve housing having spaced ports connected respectively to the interiors of said expansible members, a valve member in said valve housing, and an actuating member for said valve member, said valve member including a valve plug having a passageway thereon for permitting restricted flow between said ports when said valve plug is in covering relation to one of said ports, said valve member being movable with respect to said ports to permit free flow between said ports, restrict the flow between said ports and cut off the flow between said ports.

References Cited in the file of this patent

UNITED STATES PATENTS

| 2,142,174 | Burrow | Jan. 3, 1939 |
| 2,788,094 | Knowles | Apr. 9, 1957 |

FOREIGN PATENTS

| 672,833 | Great Britain | May 28, 1952 |
| 1,118,721 | France | June 11, 1956 |